United States Patent [19]
Chapman

[11] Patent Number: 5,974,027
[45] Date of Patent: *Oct. 26, 1999

[54] TELECOMMUNICATIONS NETWORK INCLUDING A CHANNEL SWITCHING PROTECTION ARRANGEMENT

[75] Inventor: Stephen Taylor Chapman, Buxton, United Kingdom

[73] Assignee: GPT Limited, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/687,599
[22] PCT Filed: Feb. 10, 1995
[86] PCT No.: PCT/GB95/00271
  § 371 Date: Oct. 10, 1996
  § 102(e) Date: Oct. 10, 1996
[87] PCT Pub. No.: WO95/22860
  PCT Pub. Date: Aug. 24, 1995

[30] Foreign Application Priority Data

Feb. 19, 1994 [GB] United Kingdom .................... 9403223

[51] Int. Cl.⁶ ....................................................... H04J 3/14
[52] U.S. Cl. ........................................... 370/228; 370/244
[58] Field of Search ..................................... 370/216, 221, 370/222, 223, 224, 225, 226, 227, 228, 241, 248, 252, 278, 522, 524, 375, 376, 377, 378, 360, 465, 535, 537, 536, 539, 541; 340/827

[56] References Cited

U.S. PATENT DOCUMENTS

| 4,835,763 | 5/1989 | Lau . | |
|---|---|---|---|
| 5,081,452 | 1/1992 | Cozic | 370/223 |
| 5,179,548 | 1/1993 | Sandesara | 370/222 |
| 5,216,666 | 6/1993 | Stalick | 370/222 |
| 5,315,594 | 5/1994 | Noser | 370/278 |
| 5,331,628 | 7/1994 | Cheng et al. | 370/248 |
| 5,341,364 | 8/1994 | Marra et al. | 370/228 |
| 5,406,401 | 4/1995 | Kremer | 370/224 |
| 5,442,620 | 8/1995 | Kremer | 370/224 |
| 5,469,428 | 11/1995 | Tokura | 370/224 |

FOREIGN PATENT DOCUMENTS

| 0 573 211 A2 | 12/1993 | European Pat. Off. . |
|---|---|---|
| 2 282 301 | 3/1995 | United Kingdom . |

OTHER PUBLICATIONS

*A Novel Passive Protected SONET Bidirectional Self–Healing Ring Architecture*, Tsong Ho Wu, et al., 8317 Journal of Lightwave Technology, Sep. 10, 1992, No. 9, New York, US.

*Self–Healing Rings in a Synchronous Environment*, Izaz Haque, et al., IEEE Lts, Nov. 1991, pp. 30–37.

Primary Examiner—Huy D. Vu
Attorney, Agent, or Firm—Kirschstein et al.

[57] ABSTRACT

An SDH (Synchronous Digital Hierarchy) telecommunications network has a plurality of interconnected nodes (1, 2, 3, 4). Working channels (7,6) are defined between respective pairs of nodes (1,2 and 3,4) with one common protection channel (5) serving a plurality of working channels (5,6) such that in the event of a fault on a working channel traffic signals passing from a first node (3) to a second node (4) along that working channel (6) are switched onto the protection channel (7). The first node (3) is then operative to transmit a channel trace signal along with the traffic signals which serves to identify the respective channel. The second node (4) is operative to monitor for the presence of a channel trace signal on the protection channel (7) for which it is the terminating node and upon detection thereof to switch traffic signals associated with that trace signal on the protection channel (7) into the second node (4) for connection to an onward destination.

5 Claims, 4 Drawing Sheets

TELECOMMUNICATIONS NETWORK INCLUDING A CHANNEL SWITCHING PROTECTION ARRANGEMENT

BACKGROUND OF THE INVENTION

This invention relates to a telecommunications network including a channel switching protection arrangement and in particular relates to a way of identifying a channel, section, path or the like so that it can be switched remotely in an SDH (Synchronous Digital Hierarchy) network.

Conventionally in SDH the term "section" is associated with the physical links between adjacent nodes in a network, while the term "path" is associated with a communication link between a pair of nodes, wherever they are located in the network. Each section and path is uniquely identified in SDH by a so called section or path trace signal respectively which has in the past been used as a means of checking that a traffic signal arriving at a particular node is the correct one and for raising an alarm signal if it is not. As used within the specification the term "channel" will be used to describe either a path or a section, the important factor being that each channel, path or section connecting a pair of nodes is uniquely identified by means of a trace signal.

SDH, and the similar North American SONET (Synchronous Optical Network) system, provide a number of protection strategies including Multiplex Section and Path Protection. These strategies provide an adequate means for supporting a 1+1 or 1:1 architecture (i.e. those where one protection path or section serves one working path or section). However a 1:n architecture (i.e. where one protection path or section serves n working paths or sections) is of limited use in Multiplex Section Protection and is not provided for at all by Path Protection.

Multiplex Section Protection (MSP) provides a means of protecting the STM-N (Synchronous Transport Module)/STS-n (Synchronous Transport Signal) signal against channel-associated failures within the multiplex section. A protocol is supported by the K1/K2 bytes and as such provides for either linear protection switching between two adjacent sites or ring switching where the protection between two adjacent sites has also failed.

Path Protection provides a means of protecting the VC-n (Virtual Container)VT-n (Virtual Tributary) signal against channel associated failure within the higher-order/lower-order path respectively. A protocol has been proposed that will support a 1+1 or 1:1 switching only and in its present form could never support a 1:n architecture due to the vast amount of paths present at any one node and as such in the entire network.

SUMMARY OF THE INVENTION

One method of avoiding long delays in a bidirectional multiplex section—switched self healing ring transmission system is described in EP 0573211. The switching paths to be protected are distributed to ring node other than those immediately adjacent the failure. Each node if it has been communication traffic affected by the failure can bridge and switch to and from the protection paths.

The present invention provides, in one aspect, a telecommunications network of a type operating using Synchronous Digital Hierarchy (SDH) which comprises a plurality of interconnected nodes in which working channels are defined between respective pairs of nodes, and one common protection channel is provided to serve a plurality of working channels characterised by means for detecting a fault at a first node on a working channel traffic signals passing from a first node to a second node, means for switching that working channel on to the protection channel, the first node being operative to transmit a channel trace signal along with the traffic signals which serves to identify the respective channel, the second node being operative to monitor for the presence of a channel trace signal on a protection channel for which it is the terminating node and upon detection thereof to switch traffic signals associated with that trace signal on the protection channel into the said second node for connection to an onward destination.

The present invention makes use of the channel trace signal, (i.e. Section Trace JO—previously C1 in the Section Overhead) and Path Trace (J1 in the High Order Path Overhead, J2 in the Low Order Path Overhead) as a means of identifying channels and for initiating the switching of the traffic signals onto the protection channels. The channel trace signal does not need to take any special format save that it should be unique within the network to a respective channel. Because in SDH a suitable signal is already provided for other purposes this means that the invention can make use of current standards and can therefore be implemented relatively easily.

In a preferred embodiment the protection channel is in the form of a ring-shaped bi-directional channel, the first node being operative in the event of a fault, to initially transmit traffic signals in both directions around the ring, the second node being operative to monitor each direction of the channel and to select traffic signals from that direction corresponding to the direction of the working channel. The working channel will normally be the shortest route between any connected pair of nodes and this allows the protection channel to be used efficiently.

Preferably the second node is additionally operative to transmit a channel trace signal along the said direction for receipt by the first node which is then operative to cease transmitting signals in the opposite way of said direction.

This allows a structure to be provided in which a large proportion of the protection channel can be disconnected from the nodes being protected, and which is thereby available for protecting other channels in the network.

Preferably the network is operative, when the protection channel is not being used for protective purposes to route low-priority traffic signals on the protection channel.

In another aspect the invention provides a method used in a telecommunications network of a type operating using Synchronous Digital Hierarchy (SDH) which comprises a plurality of interconnected nodes, in which a working channel is defined between respective pairs of nodes and one common protection channel is provided for a plurality of working channels; the method being for switching traffic signals onto the protection channel upon detection of a fault in a working channel at a first node and being characterised by the steps of: transmitting a channel trace signal onto the protection channel, which trace signal serves to identify the working channel; upon receipt, at a second node, of the trace signal on the protection channel for which it is the terminating node, switching traffic signals associated with that trace signal into the second node for connection to an onward destination.

BRIEF DESCRIPTION OF THE DRAWINGS

In order that the invention may be well understood an example of a Path Protection mechanism will now be described with reference to the accompanying diagrammatic drawings in which.

DETAILED DESCRIPTION OF THE PREFERRED EMBODIMENTS

Figure 1:
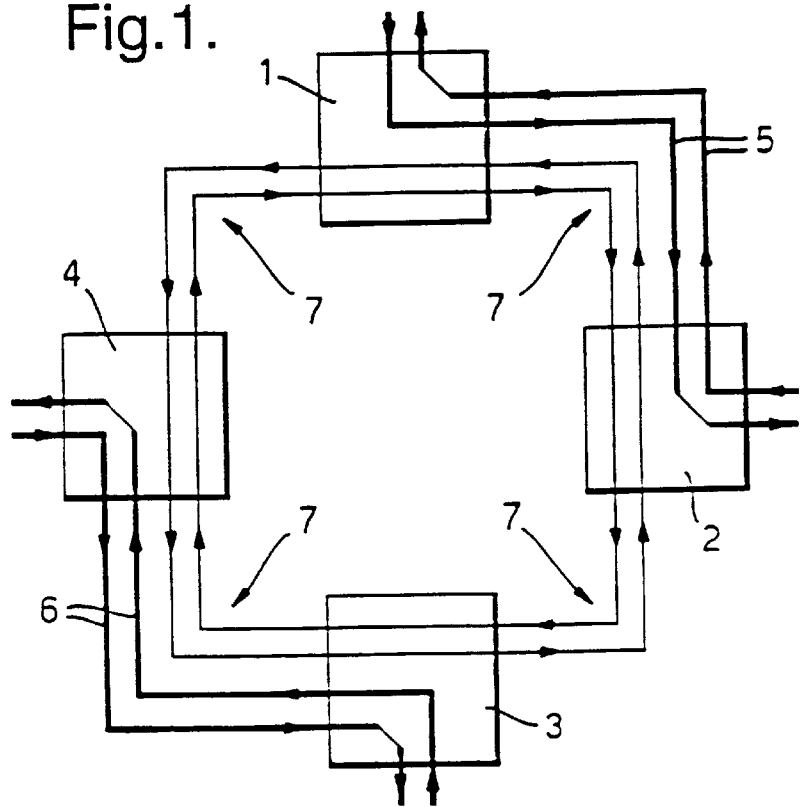
FIG. 1 is a schematic view of a network according to the invention before a fault condition has developed.

FIG. 1 shows a much simplified SDH telecommunications network including four nodes, or add-drop multiplexors 1, 2, 3, 4. Nodes 1 and 2 are interconnected by a bi-directional working path or channel 5, while nodes 3 and 4 are connected by a bi-directional working channel 6. According to the invention a bidirectional protection path or channel 7 is provided which in the example shown is of a closed ring shape and serves to interconnect all the nodes 1, 2, 3, 4 in the network and protect both working paths 5 and 6. The protection channel 7 is of a VC (Virtual Container) type such as a VC12 or VC3. The working paths 5, 6 are of the same VC type as the protection ring 7.

A discussion of the mechanism by which traffic signals are switched onto the protection channel 7 follows later on but below there is a description of some of the features of the network which enable the switching actions to take place. As is well known in SDH, signals are transmitted in packets as virtual containers (VCs). These contain bits which are assigned a variety of functions. In particular two automatic switch initiation criteria are provided at least one of which must be flagged before any switching action occurs onto the protection path 7. The two criteria are:

1. Signal Fail (SF): A failure of the VC caused by AU (Admin Unit)/TU (Tributary Unit) AIS (Alarm Indication Signal), AU/TU LOP (Loss of Pointer), VC EBER (Excessive Bit Error Ratio), VC Signal Label Mismatch, VC Path Trace Mismatch or some other VC linked failure condition.
2. Signal Degrade (SD): A failure of the VC caused by a BER (Bit Error Rate) exceeding a preselected threshold.

A Wait to Restore period (WTR) of between 0–30 minutes is implemented in order to prevent chattering of the protection switch due to intermittent failure. Therefore the working path needs to be fault free for a designated period of time before the switch is released.

The operator of the network at a Network Management Centre (not shown) is provided with the following operator selectable switch commands:

1. Lockout of protection: This prevents any of the worker or low priority paths from accessing the protection ring. If any path is currently utilising the protection ring then this command shall cause the traffic to switch back to the worker path.
2. Forced switch to protection: This transfers the selected working path to the protection ring unless it is satisfying an equal or higher priority request.
3. Manual switch to protection: This transfers the selected working path to the protection ring provided that it is fault free and not satisfying an equal or higher priority request.
4. Clear: This clears the current operator entered switch request.

Automatic Protection Switch (APS) byte definition (henceforth referred to as K3) is also provided. The APS byte (K3) consists of 6 bits and is transmitted on both the worker and protection paths although only the protection path is monitored for its receipt.

The Switch Request is operated by Bits 1–4: The switch request is assigned as indicated in Table 1 in descending order of priority.

TABLE 1

Automatic Protection Switch (APS) Byte (bits 1–4) Switch Request Priority

| Bits | Condition | Priority |
| --- | --- | --- |
| 0000 | Lockout of protection | Highest |
| 0001 | Forced switch to protection | |
| 0010 | Signal fail high priority | |
| 0011 | Signal fail low priority | |
| 0100 | Signal degrade high priority | |
| 0101 | Signal degrade low priority | |
| 0110 | (Not used) | |
| 0111 | Manual switch to protection | |
| 1000 | (Not used) | |
| 1001 | Wait to restore | |
| 1010 | (Not used) | |
| 1011 | (Not used) | |
| 1100 | (Not used) | |
| 1101 | Reverse request | |
| 1110 | Low Priority Traffic | |
| 1111 | No request | Lowest |

The path that requests the switch is indicated by the Path Trace (i.e either J1 or J2).

Bit 5 is used by a Long Path Control upon activation of a switch request Traffic can be switched in two directions around the ring (i.e East and West). There are two potential routes by which the worker traffic can be re-connected, namely a short path and a long path. It is assumed that the shortest route will be in the same direction of transmission as the worker paths traffic and will therefore constitute the preferred protection route. In order to keep as much of the protection ring free of traffic as possible there is provided a means of telling the remote end to disable the bridging of traffic along the long path if traffic has been selected from the shorter route instead. Table 2 describes the assignment of this bit.

TABLE 2

Automatic Protection Switch (APS) Byte (bit 5) Long Path Control

| Bit | Long Path Control |
| --- | --- |
| 1 | Enable bridging of traffic to the long path |
| 0 | Disable bridging of traffic to the long path |

In the switch architecture Bit 6 is used to indicate whether protection is 1+1 or 1:n and is assigned as indicated by Table 3. If the received switch architecture bit indicates 1+1 then a 'protection architecture mismatch' alarm is raised.

TABLE 3

Automatic Protection Switch (APS) Byte (bit 6) Switch Architecture Type

| Bit | Switch Architecture Type |
| --- | --- |
| 1 | Provisioned for 1:n mode |
| 0 | Provisioned for 1 + 1 mode |

The rules by which the K3 byte is generated will now be discussed.

Local SF and SD conditions, WTR and operator requests are evaluated on a priority basis within a node as indicated in Table 1. If local conditions of the same level are detected for different paths at the same time, the condition with the lowest path trace value takes priority. Of these evaluated requests, the one with the highest priority replaces the current local request. The priorities of the local request and remote request received via the K3 byte are then evaluated again according to Table 1 (the received reverse request is not considered in the comparison).

The transmitted K3 indicates:
  a) a reverse request if the received path trace matches a local worker paths expected path trace and the remote request is of higher priority.
  b) the local request in all other cases.

The K3 byte is set only in the worker paths POH and is transferred onto the protection ring by control of the bridge.

In order to effect the long path control the transmitted K3 bit 5 indicates:
  a) disable if the received path trace matches that of a local worker paths and the direction of receipt is the same as that of the worker path.
  b) enable in all other cases.

The bridge around a break or fault in a worker path can be controlled either locally or remotely depending upon the priority of the switch requests. If a local switch request is of the highest priority then the designated worker paths traffic are bridged onto the protection path in both directions around the ring.

If the remote request is of higher priority and the received path trace value does not match any of the local worker paths then the bridge is released (i.e. the traffic is connected through the node from line to line). If however the path trace matches then the worker paths traffic are bridged onto the protection ring to both the East and West.

Traffic ceases to be bridged to the long path upon receipt of K3 bit 5 indicating the disable request.

The selector is controlled by the received and expected Path Trace values on the protection ring. Each worker path possessing the same expected path trace as the received value selects traffic from the protection ring giving priority to the direction of the worker paths traffic.

The path trace is used to identify the path that the any switch request is for and as such need not deviate from current SDH standards. The only provision on this is that different path traces are allocated to both the transmit and receive directions in order to prevent the inadvertent looping back of traffic. In SDH the CCITT standard for path and section trace is defined under G709 and G708 respectively. The Trace is a byte used to respectively transmit an access port identifier so that a receiving port can verify its combined connection to the intended transmitter. The Trace signal has not previously been used to initiate a traffic switching action.

Should the transmitted value of the path trace on the protection ring not match the received value for a certain period of time then a 'path protection protocol failure' alarm is raised.

In the quiescent state the protection ring is neither generated nor terminated and as such its payload is unpredictable. However it is a relatively simple task to ensure that it contains AIS when not in use and hence the choice of '1111' for the lowest priority switch request.

Reference will now be made to FIGS. 1 to 7 which illustrate an example of the switching action utilising the protocol just described over a ring of four multiplexers, 1–4 where a protection ring 7 is able to protect two independent worker paths, 5 and 6.

Figure 2:
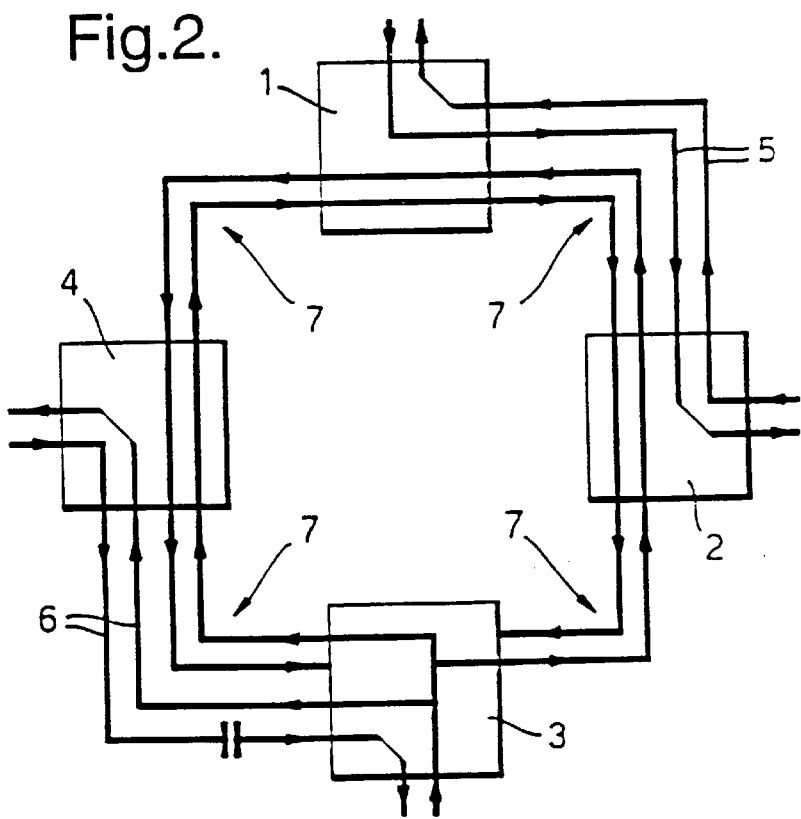
FIGS. 2 to 5 are the same as FIG. 1 except that various steps are illustrated after a fault condition has developed.

In FIG. 2 the working path 6 is broken in one direction only whilst the protection ring 7 remains intact as it resides in a separate fibre. Traffic is therefore bridged in both directions around the protection ring 7 as illustrated. Node 3 will set K3 to indicate 'SF' and 'Long Path Enable' which will be transferred together with the path trace onto the protection ring by virtue of the bridging action. Node 3 will recognise that the switch request on the protection ring was generated by itself as the path trace will be the same as that which it is transmitting.

Figure 3:
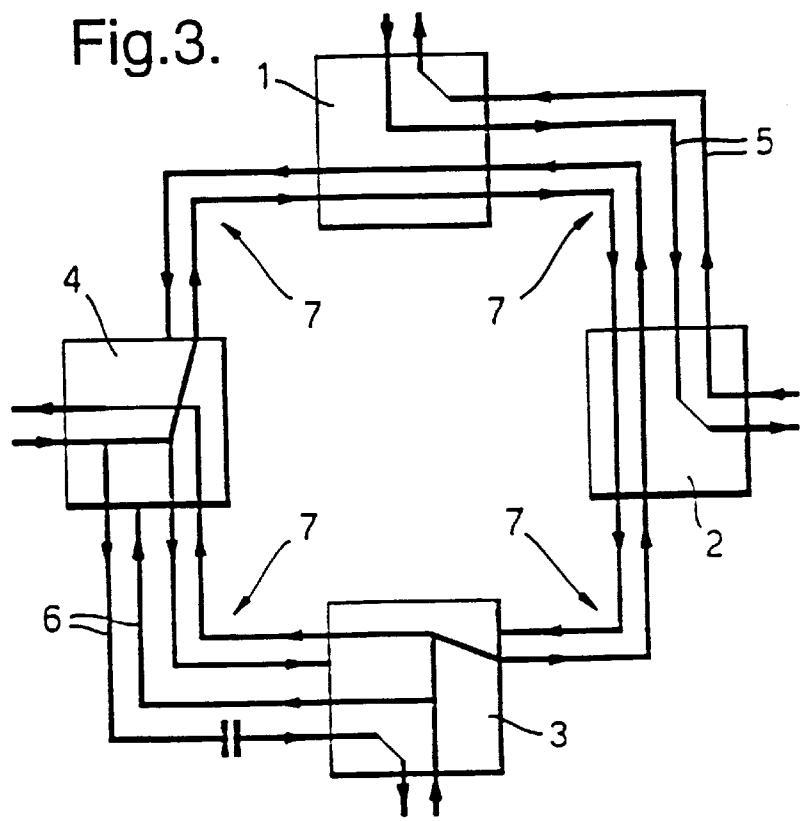

In FIG. 3, Node 4 recognises the incoming path trace as being the same as the expected value of its terminated traffic. Recognising the path trace from both sides of the ring it will assume that the direction of the working paths traffic is the preferable route (i.e. crosses the least number of nodes) and select traffic from that direction. The K3 byte is set to indicate 'Reverse Request' and 'Long Path Disable' as traffic has been successfully selected from the short path. The Bridge performs in both directions around the ring as commanded by the received K3 bit 5.

Figure 4:
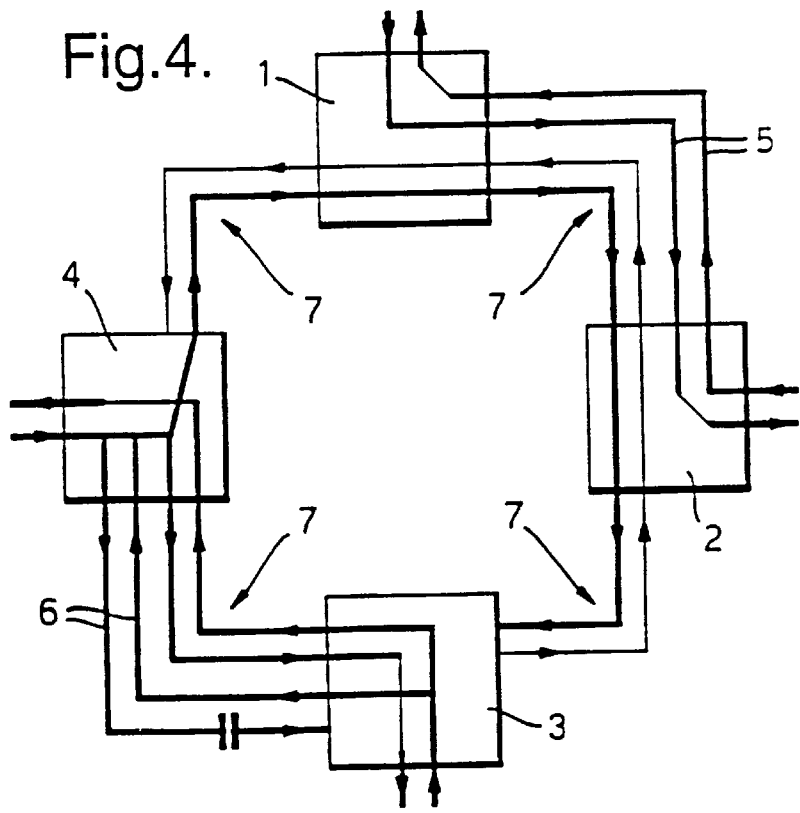

In FIG. 4, Node 3 recognises the incoming path trace as being the same as the expected value of its dropped traffic and therefore selects traffic from the protection ring using the short path. This causes the transmitted value of K3 bit 5 to be changed to 'disable' as the relevant path trace was received via that route. The bridging of traffic onto the long path is also disabled due to the received value of K3 bit 5.

Figure 5:
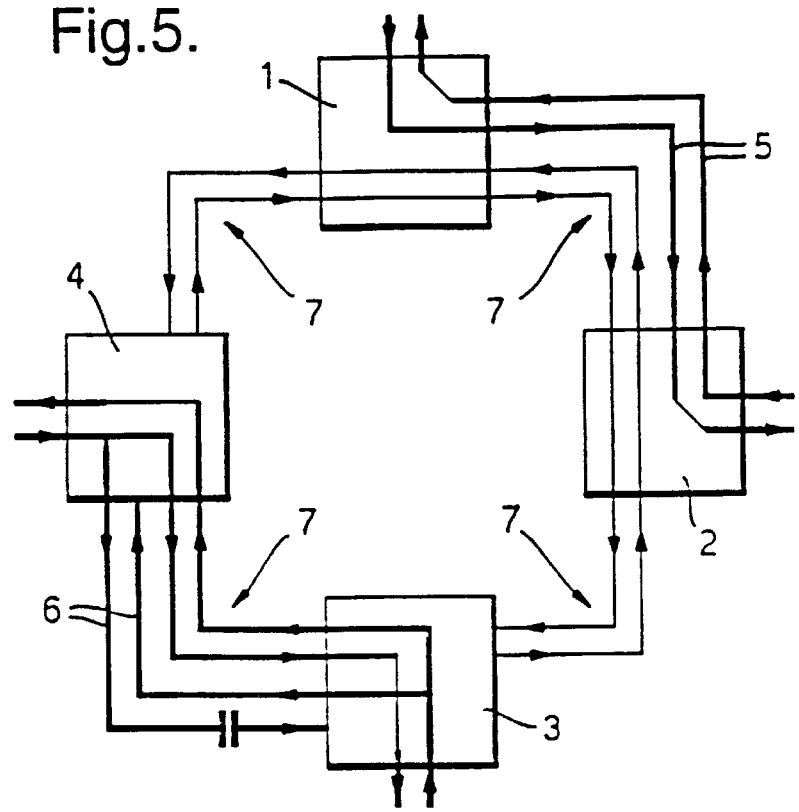

FIG. 5 shows that node 4 has disabled the bridge onto the long path due to the receipt of K3 bit 5 indicating a 'disable'. As can be seen the disabling of the bridge along the long path frees a portion of the ring off so that it can protect another path or carry low priority traffic.

Should the protection ring be subsequently severed across the short path (i.e. between nodes 3 and 4) then long path bridging requests shall be transmitted by virtue of the failure to receive a valid path trace via the short route.

On recovery of the failed path node 3 shall enter the 'WTR' state and as such the bridge and selectors shall remain unchanged unless a higher priority condition in the ring exists.

When the WTR expires node 3 sets K3 to 'No Request'. The Far end receiving the No Request will drop its bridge and release its selector. The mismatch of the path trace values will then cause node 5 to do likewise.

Figure 6:
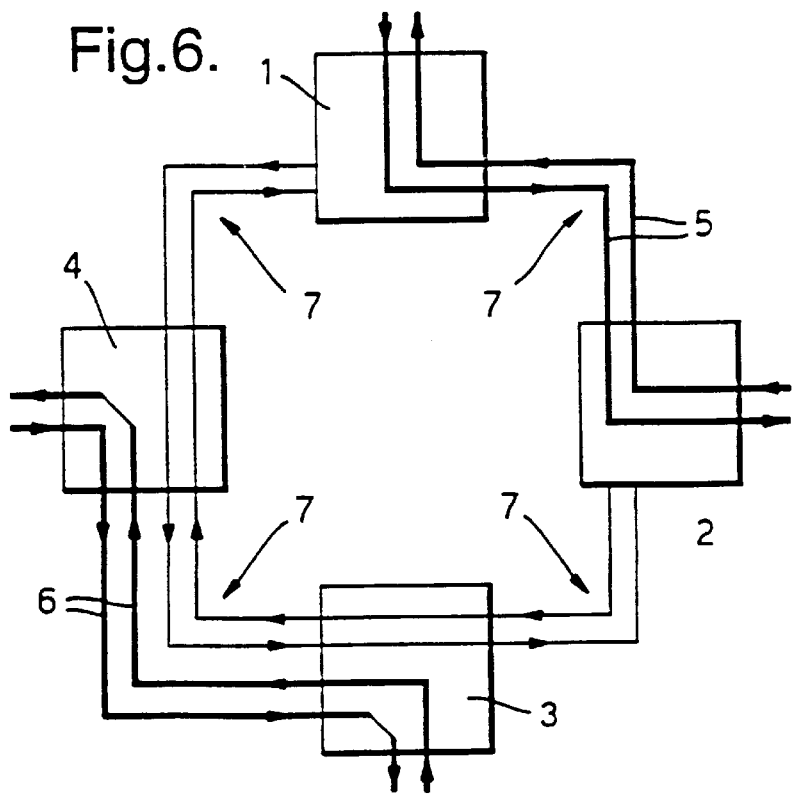
FIG. 6 illustrates the use of the network to route low priority traffic.

FIG. 6 shows a situation where the protection path carries low priority traffic. The K3 byte is set to indicate 'Low priority traffic' at its termination points whether at the ring or not. A path trace is also assigned to it and as such multiple low priority traffic paths can be supported throughout the ring simultaneously.

Figure 7:
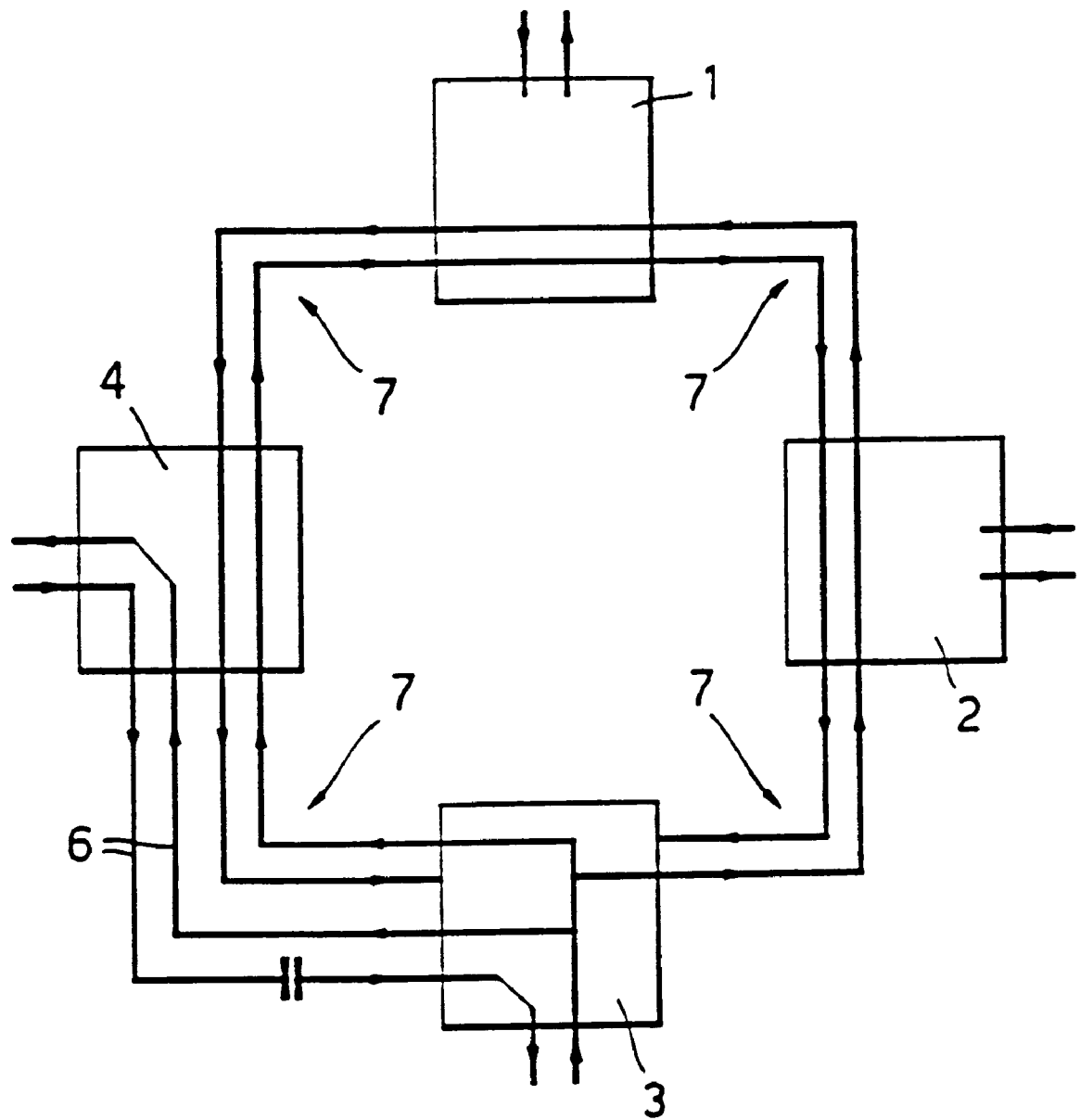
FIG. 7 illustrates the use of the network to route traffic in both directions around a protection ring when a working path is broken.

In FIG. 7 working path 6 is broken in one direction only whilst the protection ring 7 is left intact due to it residing in a separate fibre. Traffic is therefore bridged in both directions around the protection ring as illustrated. Node 3 will set K3 to indicate 'SF and Long Path Enable' which will be transferred together with the path trace onto the protection ring by virtue of the bridging action. As the low priority path has a lower priority switch request and neither Node 1 nor 2 recognises the associated path trace the bridge is released and traffic connected straight through the relevant nodes. Thus in this way the low priority traffic is overridden and protection switching shall proceed in an identical manner to the example previously described.

The present invention can have the following advantages:
  A 1:n path protection architecture can be more easily provided, which is advantageous over a 1+1 scheme in that it makes more efficient use of a networks resources and does not restrict the number of nodes in a ring. In the 1+1 case the maximum number of protected paths that can be supported in an entire ring would be only 63×n (assuming a 63 channel frame structure and where n represents the number of STM1s). Thus the larger the ring the fewer the number of paths that can be terminated at each node. As the proposed 1:n scheme allows a single path to protect a number of different paths distributed around the ring there is no limit to the number that can be terminated.

A 1:n scheme also allows low priority traffic to be carried by the protection channel when unused—a 1+1 scheme cannot support this as the protection path must be permanently bridged.

The restriction on the number of nodes that a MS level self healing ring can support by use of the section trace for channel identification is removed.

The scheme requires fewer bits for any signalling mechanism as the means of channel identification is already provided by the Section/Path Trace.

Although the invention has been described with reference to a Path based protection arrangement, a Section based arrangement can also be constructed using the same principles.

I claim:

1. A telecommunications network of a type operating using Synchronous Digital Hierarchy (SDH) which includes a plurality of interconnected nodes in which working channels are defined between respective pairs of the nodes, and one common protection channel is provided to serve a plurality of the working channels, said network comprising: means for detecting a fault at a first node on a working channel passing traffic signals from a first node to a second node; and means for switching that working channel on to the protection channel, the first node being operative to transmit a channel trace signal in the form of a path overhead signal or a J0 byte of a section overhead signal along with the traffic signals which serves to identify the respective channel, the second node being operative to monitor for the presence of a channel trace signal on the protection channel for which it is the terminating node, and upon detection thereof, to switch traffic signals associated with that trace signal on the protection channel into the second node for connection to an onward destination.

2. The telecommunications network according to claim 1, said network being operative, when the protection channel is not being used for protective purposes, to route low priority traffic signals on the protection channel.

3. In a telecommunications network of a type operating using Synchronous Digital Hierarchy (SDH) which includes a plurality of interconnected nodes in which a working channel is defined between respective pairs of the nodes and one common protection channel is provided for a plurality of the working channels, a method of switching traffic signals onto the protection channel upon detection of a fault in a working channel at a first node, said method comprising the steps of: transmitting a channel trace signal in the form of a path overhead signal or a J0 byte of a section overhead signal onto the protection channel, said trace signal serving to identify the working channel; and upon receipt, at a second node, of the trace signal on the protection channel for which it is the terminating node, switching traffic signals associated with that trace signal into the second node for connection to an onward destination.

4. A telecommunications network of a type operating using Synchronous Digital Hierarchy (SDH) which includes a plurality of interconnected nodes in which working channels are defined between respective pairs of the nodes, and one common protection channel is provided to serve a plurality of the working channels, said network comprising: means for detecting a fault at a first node on a working channel passing traffic signals from a first node to a second node; and means for switching that working channel on to the protection channel, the first node being operative to transmit a channel trace signal along with the traffic signals which serves to identify the respective channel, the second node being operative to monitor for the presence of a channel trace signal on the protection channel for which it is the terminating node, and upon detection thereof, to switch traffic signals associated with that trace signal on the protection channel into the second node for connection to an onward destination, the protection channel being in the shape of a bi-directional channel ring, the first node being operative, in the event of a fault, to initially transmit traffic signals in both directions around the ring, the second node being operative to monitor each direction of the channel and to select traffic signals from one of the directions corresponding to the direction of the working channel.

5. The telecommunications network according to claim 4 in which the second node is additionally operative to transmit a channel trace signal along said one of the directions for receipt by the first node which is then operative to cease transmitting signals in the opposite direction to said one direction.

* * * * *